(12) United States Patent
Nakazawa

(10) Patent No.: US 8,124,706 B2
(45) Date of Patent: Feb. 28, 2012

(54) ADHESIVE COMPOSITION COMPRISING END-REACTIVE ACRYLIC POLYMER AND USES THEREOF

(75) Inventor: Mitsuhiko Nakazawa, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 329 days.

(21) Appl. No.: 12/597,112

(22) PCT Filed: Mar. 25, 2008

(86) PCT No.: PCT/JP2008/055547
§ 371 (c)(1),
(2), (4) Date: Oct. 22, 2009

(87) PCT Pub. No.: WO2008/132916
PCT Pub. Date: Nov. 6, 2008

(65) Prior Publication Data
US 2010/0121014 A1   May 13, 2010

(30) Foreign Application Priority Data

Apr. 24, 2007   (JP) .................. 2007-114231

(51) Int. Cl.
*C08F 222/10* (2006.01)

(52) U.S. Cl. ............ 526/325; 526/318.44; 526/319

(58) Field of Classification Search ........... 526/325, 526/318.44, 319
See application file for complete search history.

(56) References Cited

U.S. PATENT DOCUMENTS

| | | | |
|---|---|---|---|
| 6,388,026 B1 | 5/2002 | Campbell et al. | |
| 6,783,850 B2 | 8/2004 | Takizawa et al. | |

FOREIGN PATENT DOCUMENTS

| | | | |
|---|---|---|---|
| JP | 58087171 A | | 5/1983 |
| JP | 60133007 A | | 7/1985 |
| JP | 1178567 A | | 7/1989 |
| JP | 4366103 A | | 12/1992 |
| JP | 08239405 A | * | 9/1996 |
| JP | 9235539 A | | 9/1997 |
| JP | 2001181589 A | | 7/2001 |
| JP | 2001512753 A | | 8/2001 |
| JP | 8239405 A | | 11/2009 |
| WO | 03004543 A1 | | 1/2003 |

* cited by examiner

*Primary Examiner* — Michael M Bernshteyn
(74) *Attorney, Agent, or Firm* — The Webb Law Firm

(57) ABSTRACT

An adhesive composition includes 100 parts by weight of (a) a (meth)acrylic monomer and 10 to 400 parts by weight of (b) a (meth)acrylic polymer, wherein the weight-average molecular weight of the (meth)acrylic polymer (b) in terms of standard polystyrene, as measured by GPC, is in the range of 50,000 to 800,000, and the (meth)acrylic polymer (b) has 0.3 to 1 end group represented by the formula (1) based on one polymer chain.

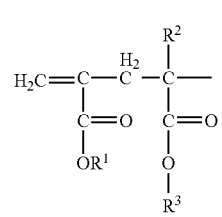

(1)

7 Claims, 1 Drawing Sheet

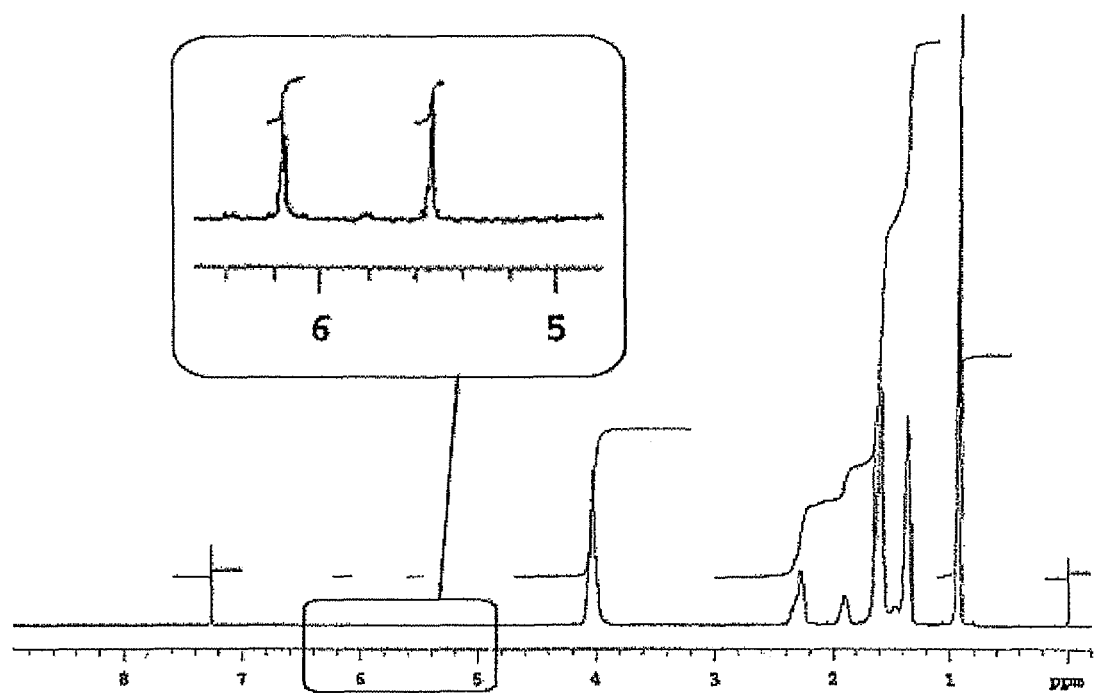

ADHESIVE COMPOSITION COMPRISING END-REACTIVE ACRYLIC POLYMER AND USES THEREOF

TECHNICAL FIELD

The present invention relates to an adhesive composition comprising an acrylic polymer and an acrylic monomer and containing a specific amount of an end-reactive acrylic polymer in the acrylic polymer, an adhesive sheet having an adhesive layer comprising the adhesive composition, and an acrylic adhesive.

BACKGROUND ART

As adhesives, rubber-based adhesives, acrylic adhesives, epoxy-based adhesives, vinyl ester-based adhesives, silicone-based adhesives, etc. have been used in the past. Of these, (meth)acrylic adhesives are excellent in weathering resistance and oxidation deterioration resistance, and they are practically applied to uses in various fields. For example, uses for household articles, such as double-coated tapes, packaging tapes and dust collecting rollers, and industrial uses, such as industrial tapes for assembling or fixing parts of automobiles or household electrical appliances can be mentioned, and the (meth)acrylic adhesives have been used in a wide field.

Most of such adhesives are used as adhesive articles in an embodiment wherein they are applied to one or both surfaces of a substrate, such as paper, a plastic film, a woven fabric, a nonwoven fabric or a foam product. Such adhesive articles are requested to be free from occurrence of troubles, such as peeling, lifting, foaming and blister, in various use environments.

In order to solve such troubles, the acrylic adhesives need to have performance characteristics, such as cohesive force, adhesive strength and stress relaxation property, with a good balance.

The adhesive articles are sometimes used by applying them to not only plain surface but also an adherend having depressions and protrusions on its surface or an adherend having a curved surface or by applying them to a base having flexibility such as a film that is deformed when it is laminated. In such application conditions where stress is applied to the adhesive layer, adhesive performance of higher level is required, and various trials and errors have been made.

For example, it is disclosed in a patent document 1 that an adhesive having a good balance of adhesive strength, cohesive force, heat resistance and stress relaxation property is obtained by allowing the acrylic polymer to have a high molecular weight of 500,000 to 1,500,000.

In a situation such that great stress is applied as in the case of application to a curved surface, however, a satisfactory stress relaxation effect is not obtained by merely allowing the adhesive polymer to have a high molecular weight. In the preparation of a high-molecular weight polymer, further, there are problems that the polymerization operation is difficult and special polymerization conditions and apparatus become necessary. Moreover, because the high-molecular weight polymer has an extremely high viscosity, the polymer needs to be diluted with a large amount of an organic solvent in order to control the polymer to have a viscosity suitable for the application, so that there are problems that the cost is high and drying of a solvent requires great energy.

In a patent document 2, there is disclosed an adhesive obtained by blending an acrylic polymer having a highly reactive hydroxyl group in a polymer and having a weight-average molecular weight of 5,000 to 300,000 with a polyfunctional isocyanate compound containing bifunctional isocyanate as a main body. In this adhesive, by allowing the polymer of a relatively low-molecular weight to react with the polyfunctional isocyanate compound, the acrylic polymer is linked to perform chain extension (increase of molecular weight). By virtue of this, the high-molecular weight polymer acquires properties such as high cohesive force and stress relaxation property.

In the reaction of the polymer having a functional group in a polymer chain with the polyfunctional monomer, however, gelation reaction attributable to three-dimensional crosslinking takes place simultaneously with the extension of the polymer chain length, and therefore, the same performance as in the case of using the high-molecular weight polymer is not obtained. Moreover, because the reaction of the hydroxyl group with the isocyanate group is liable to be influenced by moisture content in air, there is a problem that it is hard to obtain stable properties depending upon the environmental changes.

In a patent document 3, a polymer having a molecular weight of not more than 300,000, which is obtained by photopolymerization of a macromonomer having a molecular weight of about hundreds to tens of thousands and having a reactive functional group at the molecular end and an acrylic monomer, and an adhesive having high cohesive force and high adhesive strength are disclosed. In this invention, the macromonomer and the adhesive polymer are bonded to take a microphase separation structure, and thereby, high cohesive force and high adhesive strength are obtained in spite of a low-molecular weight.

The usual macromonomer, however, has unstable reactivity, and hence, a free macromonomer which does not react with the monomer remains or an adhesive polymer of a low-molecular weight is formed, and these are liable to bleed from the resulting adhesive. Further, in order to form a microphase separation structure, the macromonomer and the acrylic monomer need to be greatly different from each other in composition. On this account, these monomers need to be selected taking their respective compatibilities into consideration, and not only the selection is difficult but also the application range is narrow. Furthermore, there is a fear that the transparency of the acrylic adhesive is impaired or a problem that the stabilization of the adhesive properties is difficult.

An attempt to use the polymer (macromonomer) having reactivity as above to thereby develop cohesive force or adhesive strength of the high-molecular weight polymer or to thereby obtain other various functions has been made. However, the polymerization reactivity between the macromonomer and other monomers is insufficient, or the molecular weight of the polymer obtained by the polymerization is not increased so much because the molecular weight of the macromonomer is low. Thus, sufficient performance has not been obtained yet.

Usually, the macromonomer is prepared by a polymerization process mainly using ionic polymerization or a chain transfer polymerization process mainly using radical polymerization (e.g., patent document 4). In either preparation process, however, the macromonomer is prepared by two-step reaction wherein a functional group is first formed at the end of a polymer by using an initiator having a functional group or a chain transfer agent and then the polymer having an end functional group is allowed to react with a compound having a group reactive to the functional group and having a polymerizable unsaturated group to perform addition of the polymerizable unsaturated group to the end of the polymer. Therefore, these preparation processes are complicated and undesirable.

Further, the macromonomer having an end unsaturated group obtained by such a two-step reaction has a problem of poor reactivity in the polymerization reaction with other monomers. Furthermore, there are many problems relating to qualities such that unreacted end functional groups remain in the reaction for the addition of the polymerizable unsaturated group and a by-product due to a side reaction is present.

In recent years, a process for preparing a macromonomer by a continuous polymerization reaction wherein a vinyl monomer is continuously fed to a reaction vessel under high temperature conditions to polymerize the monomer has been proposed (see patent document 5). In this process, an excellent macromonomer having high reactivity and containing a small amount of a by-product is obtained by the reaction of one-step. However, the reaction temperature is an extremely high temperature of 180 to 500° C. Therefore, the molecular weight of the reactive polymer becomes about thousands to tens of thousands, and a polymer obtained by copolymerization of this macromonomer and other monomers does not acquire a sufficient molecular weight. Moreover, because the reaction is carried out under high temperature conditions, there is a problem that a special apparatus becomes necessary.

Patent document 1: Japanese Patent laid-Open Publication No. H01(1989)-178567
Patent document 2: Japanese Patent laid-Open Publication No. H09(1997)-235539
Patent document 3: Japanese Patent laid-Open Publication No. H04(1992)-366103
Patent document 4: Japanese Patent laid-Open Publication No. S60(1985)-133007
Patent document 5: National Publication of International Patent No. 2001-512753

Accordingly, it is an object of the present invention to provide an adhesive composition which uses an end-reactive acrylic polymer having a double bond at the end, having a high molecular weight and having high polymerization reactivity and is thereby employable as an adhesive capable of stably keeping a bonded state for a long period of time.

It is another object of the present invention to provide an adhesive sheet in which the above adhesive composition is used for an adhesive layer and an adhesive using the adhesive composition.

SUMMARY OF THE INVENTION

The adhesive composition of the present invention is an adhesive composition comprising:

100 parts by weight of (a) a (meth)acrylic monomer, and
10 to 400 parts by weight of (b) a (meth)acrylic polymer containing a (meth)acrylic ester as a main monomer,
wherein the weight-average molecular weight of the (meth)acrylic polymer (b) in terms of standard polystyrene, as measured by GPO, is in the range of 50,000 to 800,000, and
the (meth)acrylic polymer (b) has 0.3 to 1 end group represented by the formula (1) based on one polymer chain,

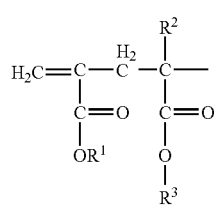

(1)

wherein $r^1$ is an alkyl or aryl group of 1 to 12 carbon atoms, $r^2$ is a hydrogen atom or a methyl group, and $r^3$ is a hydrogen atom or an alkyl or aryl group of 1 to 12 carbon atoms.

The (meth)acrylic ester is desirably contained in an amount of not less than 60% by weight in 100 parts by weight of the total of the (meth)acrylic monomer (a) and monomers to constitute the (meth)acrylic polymer (b).

Each of the acrylic adhesive and the adhesive sheet of the present invention comprises the above-mentioned adhesive composition.

The adhesive composition of the present invention contains an end-reactive acrylic polymer having a double bond at the end and having a high molecular weight, and exhibits high reactivity to other monomers in the polymerization process. On this account, a polymer of a higher molecular weight can be readily obtained, and an adhesive sheet and an adhesive composed of this polymer are excellent in heat resistance and retention of adhesion.

Further, a branched structure is constructed starting from the end double bond of the end-reactive acrylic polymer, and hence, an adhesive and an adhesive sheet excellent in stress relaxation property (application to curved surface) can be obtained.

BRIEF DESCRIPTION OF THE DRAWING

The drawing is a view of a $^1$H-NMR spectrum of a (meth) acrylic polymer obtained in Preparation Example 1.

BEST MODE FOR CARRYING OUT THE INVENTION

Next, the adhesive composition of the invention, the adhesive sheet having an adhesive layer using the adhesive composition, and the acrylic adhesive are described in detail.

In this specification, the expression "(meth)acrylic" means "acrylic" or "methacrylic".

In this specification, the expression "end-reactive acrylic polymer" means an acrylic polymer having an end group derived from an acrylic monomer at the molecular end, said end group having a polymerizable double bond.

Adhesive Composition

The adhesive composition of the invention is formed from (a) a (meth)acrylic monomer and (b) a (meth)acrylic polymer.

(a) (Meth)acrylic Monomer

The (meth)acrylic monomer (a) is a monomer to form a (meth)acrylic polymer, and examples of such monomers include:

straight-chain, branched or cyclic alkyl esters of (meth) acrylic acid, which have 1 to 15 carbon atoms, such as methyl (meth)acrylate, ethyl (meth)acrylate, n-propyl (meth)acrylate, isopropyl (meth)acrylate, n-butyl (meth)acrylate, sec-butyl (meth)acrylate, tert-butyl (meth)acrylate, n-pentyl (meth)acrylate, isoamyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth) acrylate, dodecyl (meth)acrylate, isobornyl (meth)acrylate and cyclohexyl (meth)acrylate;

aryl (meth)acrylates, such as benzyl (meth)acrylate, phenoxyethyl (meth)acrylate and phenyl (meth)acrylate;

(meth)acrylic acid alkoxy esters, such as 2-methoxyethyl (meth)acrylate, 2-ethoxyethyl (meth)acrylate, 2-methoxypropyl (meth)acrylate, 3-methoxypropyl (meth)acrylate, 2-methoxybutyl (meth)acrylate and 4-methoxybutyl (meth) acrylate;

alkylene glycol (meth)acrylates, such as ethylene glycol (meth)acrylate, polyethyleneglycol (meth)acrylate, propyleneglycol (meth)acrylate and polypropylene glycol (meth)acrylate;

hydroxyl group-containing monomers, such as 2-hydroxyethyl (meth)acrylate, 2-hydroxypropyl (meth)acrylate, 3-hydroxypropyl (meth)acrylate, 4-hydroxybutyl (meth)acrylate, 2-hydroxy-3-chloropropyl (meth)acrylate and 2-hydroxy-3-phenoxypropyl (meth)acrylate;

carboxyl group-containing monomers, such as (meth)acrylic acid, β-carboxyethyl (meth)acrylate, 5-carboxypentyl (meth)acrylate, succinic acid mono(meth)acryloyloxyethyl ester, ω-carboxypolycaprolactone mono(meth)acrylate;

amino group-containing monomers, such as aminoethyl (meth)acrylate and dimethylaminoethyl (meth)acrylate;

amide group-containing monomers, such as (meth)acrylamide and N,N-dimethyl (meth)acrylamide; and epoxy group-containing monomers, such as (meth)acrylic acid glycidyl ether.

Of these, one compound selected from acrylic acid alkyl esters having an alkyl group of 4 to 8 carbon atoms and aryl acrylates, or a mixture of two or more compounds selected from them is preferably used from the viewpoint that the adhesive properties can be readily controlled.

The functional group-containing monomers, such as hydroxyl group-containing monomers, carboxyl group-containing monomers, amino group-containing monomers, amide group-containing monomers and epoxy group-containing monomers, act as crosslinking points when a crosslinking agent is added, and therefore, they are appropriately used according the use purpose. Such a functional group-containing monomer is preferably used in an amount of 0 to 10 parts by weight in 100 parts by weight of the total of the (meth)acrylic monomer (a) and monomers to constitute the (meth)acrylic polymer (b).

Further, monomers other than the acrylic monomer can be used within limits not detrimental to the effect of the present invention. Examples of other monomers include vinyl acetate, styrene, allyl acetate, itaconic acid, crotonic acid, fumaric acid and maleic acid.

(b) (Meth)acrylic Polymer

The (meth)acrylic polymer (b) means a polymer obtained by polymerizing a monomer composition containing a (meth)acrylic ester as a main monomer, and in 100% by weight of the monomer composition, the (meth)acrylic ester is contained in an amount of not less than 50% by weight.

Examples of the (meth)acrylic esters include the aforesaid (meth)acrylic acid alkyl esters, (meth)acrylic acid aryl esters and (meth)acrylic acid alkoxy esters. Of these, the acrylic acid alkyl ester having an alkyl group of 4 to 8 carbon atoms is preferably used from the viewpoint of control of the adhesive properties to preferred ranges.

The monomer other than the (meth)acrylic ester, which is contained in the monomer composition for forming the (meth)acrylic polymer (b), is not specifically restricted as long as it can be used as the aforesaid (meth)acrylic monomer (a).

In the case where the later-described composition of the (meth)acrylic monomer (a) and the (meth)acrylic polymer is prepared at once, the (meth)acrylic polymer (b) can be obtained by incorporating the (meth)acrylic ester as a main monomer in an amount of not less than 50% by weight in 100% by weight of the monomer composition that is the total amount of the (meth)acrylic monomer (a) and monomers to constitute the (meth)acrylic polymer (b). When the (meth)acrylic ester is contained in an amount of not less than 60% by weight, preferably not less than 70% by weight, in 100% by weight of the monomer composition, polymerization reactivity and transparency of the resulting adhesive are enhanced.

The weight-average molecular weight of the (meth)acrylic polymer (b) in terms of standard polystyrene, as measured by GPC, is in the range of 50,000 to 800,000, preferably 50,000 to 700,000.

If the weight-average molecular weight in terms of standard polystyrene, as measured by GPC, is less than 50,000, the molecular weight of the resulting adhesive polymer is lowered, and sufficient performance cannot be obtained. If the weight-average molecular weight exceeds 800,000, polymerization reactivity of the end-reactive polymer having a double bond at the end, which is contained in the (meth)acrylic polymer (b), is lowered, and it becomes hard to obtain an adhesive polymer having a branched structure.

For the adhesive composition of the invention, the (meth)acrylic polymer (b) is blended in an amount of usually 10 to 400 parts by weight, preferably 20 to 300 parts by weight, based on 100 parts by weight of the (meth)acrylic monomer (a). By blending the (meth)acrylic polymer (b) in the above amount, coating workability in the case of, for example, photopolymerization reaction of the adhesive composition of the invention, is excellent, and the molecular weight of the resulting adhesive can be controlled to a proper range.

End-Reactive Acrylic Polymer

The adhesive composition of the invention contains the (meth)acrylic polymer (b) having 0.3 to 1 end group represented by the formula (1) based on one polymer chain. That is to say, in the (meth)acrylic polymer (b) in the invention, a so-called end-reactive acrylic polymer having an end group represented by the formula (1) is contained.

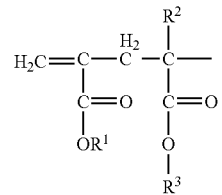

(1)

In the formula (1), $R^1$ is an alkyl or aryl group of 1 to 12 carbon atoms, $R^2$ is a hydrogen atom or a methyl group, and $R^3$ is a hydrogen atom, an alkyl or aryl group of 1 to 12 carbon atoms. The alkyl group may be straight-chain or may have a branch, and the alkyl group and the aryl group may be substituted. In the alkyl group or the aryl group, atoms other than carbon, such as oxygen atom, nitrogen atom, silicon atom and sulfur atom, may be contained within limits not detrimental to the object of the present invention.

In the end-reactive acrylic polymer contained in the (meth)acrylic polymer (b) in the invention, the monomer repeating unit located at the end has a double bond.

In order to obtain a polymer having a double bond at the end, there has been used in the past a process comprising first introducing a functional group into one end of a polymer chain during the polymerization reaction of a monomer by the use of an initiator having a functional group or a chain transfer agent and then allowing the functional group to react with a compound having a group that is reactive to the functional group and having an unsaturated double bond. As such a process, a process comprising allowing a polymer having a carboxyl group at the end to react with glycidyl methacrylate is widely known. The polymer obtained by such a process, however, has an unnecessary linking group between the polymer main chain and the end double bond. Therefore, the reactivity between the end double bond and other polymerizable monomers is low, and there is a potential that a polymer having a favorable branched structure cannot be formed.

In contrast therewith, in the end-reactive acrylic polymer for use in the invention, one of the end groups is a double bond derived from the (meth)acrylic monomer, and the monomer is bonded to the polymer main chain without an unnecessary linking group through addition polymerization, as shown in the formula (1).

On that account, the double bond at the end has high polymerization reactivity, and besides, the (meth)acrylic polymer (b) contained in the adhesive composition of the invention and containing the end-reactive acrylic polymer has a high molecular weight. Therefore, by the use of the adhesive composition of the invention, an adhesive and an adhesive sheet excellent in adhesive performance can be produced. In particular, a branched structure is readily formed starting from this end group, so that an adhesive and an adhesive sheet obtained from the adhesive composition of the invention are excellent also in the stress relaxation property (application to curved surface).

The (meth)acrylic polymer (b) has the end group represented by the formula (1) in a ratio of usually 0.3 to 1 end group/polymer chain, preferably 0.4 to 1 end group/polymer chain, more preferably 0.5 to 1 end group/polymer chain. By the use of the (meth)acrylic polymer having a highly reactive end double bond in the above ratio and having a high molecular weight, properties of the adhesive composition of the invention and properties of an adhesive and an adhesive sheet obtained from the adhesive composition can be sufficiently retained.

Process for Preparing Adhesive Composition

As the process for preparing the adhesive composition of the invention, there can be mentioned a process in which a (meth)acrylic monomer is partially polymerized to prepare a mixture of the (meth)acrylic monomer (a) and the (meth)acrylic polymer (b) at once, or a process in which an end-reactive polymer in the (meth)acrylic polymer (b) and a polymer having no end reactive group in the (meth)acrylic polymer are each prepared, and they are mixed with the (meth)acrylic monomer (a). From the viewpoint of ease of preparation, the process for preparing them at once is preferable.

That is to say, an acrylic monomer composition containing a (meth)acrylic ester in an amount of not less than 50% by weight is partially polymerized to obtain the (meth)acrylic polymer (b) containing an end-reactive acrylic polymer and the (meth)acrylic monomer (a) at once.

The (meth)acrylic polymer (b) containing an end-reactive acrylic polymer can be prepared by placing, in a reaction apparatus, a monomer that becomes constituent units, purging the apparatus with nitrogen and then performing bulk polymerization reaction under the reaction temperature conditions of 50° C. to 180° C. In general, as the reaction temperature is lowered, the molecular weight of the resulting end-reactive acrylic polymer becomes higher, but the quantity of the end double bonds formed is decreased. On the other hand, as the reaction temperature is raised, the molecular weight of the resulting end-reactive acrylic polymer is lowered, but the quantity of the end double bonds is increased. In the present invention, by setting the reaction temperature at 50° C. to 180° C., a polymer having a high molecular weight and having a double bond at the end can be obtained.

The above polymerization reaction is carried out while a molecular weight modifier such as normal dodecyl mercaptan (NDM) or α-methylstyrene and an organic solvent such as toluene are not substantially contained. By carrying out bulk polymerization reaction at a relatively low temperature without using a molecular weight modifier such as NDM and an organic solvent such as toluene, a polymer of a high molecular weight is obtained without occurrence of chain transfer reaction that causes cessation of growth of a polymer chain. Moreover, back biting reaction (1,5-hydrogen abstraction) in which the polymer end radical abstracts hydrogen at the α-position located two units before is brought about, and an end double bond is formed through β-scission.

In the polymerization reaction for forming the end-reactive polymer, it is desirable that a thermal decomposition type initiator that becomes a radical generator is not used, but even if it is used, the amount thereof is restricted as described below. By performing the polymerization reaction in this manner, too much rise of the reaction temperature due to heat of polymerization is avoided in the bulk polymerization reaction, and a polymer having a high molecular weight and having a double bond at the end can be prepared.

When an initiator is not used, the reaction temperature is selected so that the thermal polymerization should rapidly proceed. When an initiator is not used, the reaction temperature is in the range of usually 90° C. to 180° C., preferably 100° C. to 170° C. If the reaction temperature is too high, the molecular weight of the resulting end-reactive polymer is lowered, and hence, an adhesive obtained by using it is liable to have poor cohesive force. Moreover, though the resulting adhesive has a branched structure, there is potential that the stress relaxation property is not obtained sufficiently because the molecular weight of the end-reactive polymer is low.

On the other hand, if the reaction temperature is too low, the quantity of the end double bonds formed is decreased, or the reaction does not proceed rapidly and takes time.

In the case where an initiator is used, the reaction temperatures (reaction initiation temperature and maximum temperature) are selected so that the polymerization reaction should not run away, and the amount of the initiator added is controlled. When an initiator is used, the reaction initiation temperature is in the range of usually 50 to 100° C., preferably 50 to 90° C., and the maximum temperature is in the range of usually 10 to 180° C., preferably 120 to 170° C. The amount of the initiator added is in the range of usually 0.0001 to 1% by weight, preferably 0.001 to 0.1% by weight, though it relates to the half-life of the initiator at the reaction temperature.

The thus formed (meth)acrylic polymer (b) containing the end-reactive acrylic polymer having a polymerizable double bond at the molecular end has a weight-average molecular weight (Mw), in terms of standard polystyrene, of usually 50,000 to 800,000, preferably 50,000 to 700,000, and has an extremely high molecular weight as compared with end-reactive acrylic polymers hitherto publicly known. Such a weight-average molecular weight (Mw) in terms of standard polystyrene can be measured using, for example, gel permeation chromatography (GPC).

The quantity of the end double bonds based on one polymer chain in the thus obtained (meth)acrylic polymer (b) containing the end-reactive acrylic polymer can be calculated by, for example, measuring a $^1$H-NMR spectrum of the (meth)acrylic polymer (b).

As previously described, the (meth)acrylic polymer (b) may be prepared by mixing a different (meth)acrylic polymer separately prepared. In this case, the amount of the different (meth)acrylic polymer to be mixed is selected so that the end double bonds represented by the aforesaid formula (1) should be contained in the (meth)acrylic polymer (b) in a ratio of 0.3 to 1 bond/polymer.

In the case where the adhesive composition is prepared at once, the monomer residue which has not been polymerized becomes the (meth)acrylic monomer (a), and therefore, by carrying out polymerization reaction so that the rate of polymerization would become 9 to 80%, the adhesive composition of the invention containing the (meth)acrylic monomer (a) and the (meth)acrylic polymer (b) can be prepared. In order to attain such a rate of polymerization by which the components are contained in desired amounts, it is preferable to select the reaction temperature and the reaction time.

By adding or volatilizing a (meth)acrylic monomer after polymerization, the amounts of the components can be controlled to desired amounts. The adhesive composition obtained as above is a viscous liquid having a viscosity of usually 0.1 to 100 Pa·s, preferably 0.5 to 30 Pa·s, at 25° C.

Other Components

To the adhesive composition of the invention, additives which are used for preparing usual adhesives may be added within limits not detrimental to the object of the present invention. Examples of the additives include a filler selected from inorganic substances, such as calcium carbonate, aluminum hydroxide, silica, clay, talc and titanium oxide, inorganic hollow substances, such as glass balloon, Shirasu balloon and ceramic balloon, organic substances, such as nylon bead, acrylic bead and silicon bead, and organic hollow substances, such as vinylidene chloride balloon and acrylic balloon; a blowing agent; a dye; a pigment; a silane coupling agent; a polymerization inhibitor; and a stabilizer.

Adhesive Layer and Adhesive Sheet

By the use of the adhesive composition obtained as above, an adhesive layer of an adhesive sheet can be formed.

That is to say, the (meth)acrylic polymer (b) is a viscous liquid containing, as a part or a whole, an end-reactive acrylic polymer having a polymerizable double bond at the molecular end. This polymer and the (meth)acrylic monomer (a) are incorporated, then a polymerization initiator is appropriately added to prepare an adhesive composition of the invention, and polymerization is further promoted.

For the adhesive sheet of the invention, the adhesive composition is applied to at least one surface of a substrate to form an adhesive layer. It is preferable to add a reaction initiator to the adhesive composition of the invention, and it is particularly preferable to add a photopolymerization initiator to the composition.

Examples of the photopolymerization initiators include:

benzoins, such as benzoin, benzoin methyl ether, benzoin ethyl ether, methyl o-benzoylbenzoate-p-benzoin ethyl ether, benzoin isopropyl ether and α-methylbenzoin;

acetophenones, such as benzyl dimethyl ketal, trichloroacetophenone, 2,2-diethoxyacetophenone, 1-hydroxycyclohexyl phenyl ketone, 4-(2-hydroxyethoxy)phenyl-(2-hydroxy-2-propyl)ketone, α-hydroxy-α,α'-dimethylacetophenone, methoxyacetophenone, 2,2-dimethoxy-2-phenylacetophenone and 2-hydroxy-2-cyclohexylacetophenone;

propiophenones, such as 2-hydroxy-2-methylpropiophenone and 2-hydroxy-4'-isopropyl-2-methylpropiophenone;

benzophenones, such as benzophenone, methylbenzophenone, p-chlorobenzophenone and p-dimethylaminobenzophenone;

thioxanthones, such as 2-chlorothioxanthone, 2-ethylthioxanthone and 2-isopropylthioxanthone;

acylphosphine oxides, such as bis(2,4,6-trimethylbenzoyl)-phenylphosphine oxide, 2,4,6-trimethylbenzoyl-diphenylphosphine oxide and (2,4,6-trimethylbenzoyl)-(ethoxy)-phenylphosphine oxide;

ketals, such as benzyl dimethyl ketal; acyl phosphinoxide; and acyl phosphonate.

These can be used singly or in combination of two or more kinds.

Together with the above photopolymerization initiators or instead of the photopolymerization initiators, thermal polymerization initiators, e.g., peroxide compounds, such as dicumyl peroxide, di-t-butyl peroxide, 2,5-dimethyl-2,5-bis(t-butylperoxy)hexane, 2,5-dimethyl-2,5-bis(t-butylperoxy)hexyne-3, 1,3-bis(t-butylperoxyisopropyl)benzene, 1,1-bis(t-butylperoxy)valerate, benzoyl peroxide, t-butyl peroxybenzoate, acetyl peroxide, isobutyl peroxide, octanoyl peroxide, decanoyl peroxide, lauroyl peroxide, 3,3,5-trimethylhexanoyl peroxide, 2,4-dichlorobenzoyl peroxide and m-toluoyl peroxide, and azo compounds, such as azobisbutyronitrile, dimethylazoisobutyronitrile, 2,2'-azobis(4-methoxy-2,4-dimethylvaleronitrile) and 2,2'-azobis(2,4-dimethylvaleronitrile), can be blended.

Such a polymerization initiator is used in an amount of usually 0.005 to 3 parts by weight, preferably 0.01 to 2 parts by weight, based on 100 parts by weight of the total of the (meth)acrylic monomer (a) and the (meth)acrylic polymer (b).

To the adhesive composition of the invention, further, a crosslinking agent is preferably added. By adding the crosslinking agent, a three-dimensional crosslinked structure is formed in the adhesive layer, and the cohesive force of the adhesive layer is increased.

Examples of the crosslinking agents employable in the invention include an epoxy-based crosslinking agent, an isocyanate-based crosslinking agent and a metal chelate crosslinking agent. Examples of the epoxy-based crosslinking agent used herein include bisphenol. A, epichlorohydrin type epoxy resin, ethylene glycidyl ether, polyethylene glycol diglycidyl ether, glycerol diglycidyl ether, glycerol triglycidyl ether, 1,6-hexanediol glycidyl ether, trimethylolpropane triglycidyl ether, diglycidylaniline, diamine glycidyl amine, N,N,N',N'-tetraglycidyl-m-xylenediamine and 1,3-bis(N,N'-diamine glycidyl aminomethyl)cyclohexane.

Examples of the isocyanate-based crosslinking agents include tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethylxylylene diisocyanate, naphthalene diisocyanate, triphenylmethane triisocyanate, compounds obtained by addition reaction of these compounds with polyhydric alcohols such as trimethylolpropane and pentaerythritol, burrete type compounds or isocyanurate compounds of these polyisocyanate compounds, and urethane prepolymer type compounds having two or more isocyanate groups in a molecule, which are obtained by addition reaction of these polyisocyanate compounds with publicly known polyether polyol, polyester polyol, acrylic polyol, polybutadiene polyol or polyisoprene polyol.

Examples of the metal chelate crosslinking agents include compounds wherein acetylacetone, ethyl acetoacetate or the like is coordinated to polyvalent metals, such as aluminum, iron, copper, zinc, tin, titanium, nickel, antimony, magnesium, vanadium, chromium and zirconium. These crosslinking agents can be used singly or in combination of two or more kinds.

The crosslinking agent is used in an amount of usually 0.001 to 10 parts by weight, preferably 0.01 to 5 parts by weight, based on 100 parts by weight of the total of the (meth)acrylic monomer (a) and the (meth)acrylic polymer (b).

The coating solution prepared as above is applied to the surface of a substrate. The substrate is not specifically restricted, but for example, a PET film, a PVC film, a TAO film, paper, or a substrate obtained by subjecting such a film or paper to silicone treatment is employable.

To the surface of such a substrate, the coating solution is applied in a thickness of usually 5 to 3000 μm, preferably 5 to 1000 μm.

After the coating solution is applied as above, a protective film is preferably applied to the coated surface in order to prevent polymerization reaction inhibition that is caused by the contact of the coated surface with air.

After the protective film is applied as above, irradiation with ultraviolet rays, electron rays or the like is carried out. The irradiation time is in the range of usually 0.5 to 10 minutes, preferably 0.5 to 5 minutes. In the adhesive blend layer having been applied to the substrate as above, a photopolymerization initiator, a crosslinking agent, the (meth)acrylic monomer (a) that is an unreacted monomer and the (meth)acrylic polymer (b) having a polymerizable double bond at the molecular end are contained, and by the light irradiation for a short period time, these components undergo reaction all at once to form a strong adhesive layer.

The adhesive composition of the invention can be used as a solvent type acrylic adhesive by dispersing the adhesive composition in an organic solvent such as toluene and polymerizing it in the organic solvent.

EXAMPLES

The adhesive composition and the adhesive sheet of the present invention are further described with reference to the following examples, but it should be construed that the invention is in no way limited to those examples.

Evaluation was carried out under the following conditions.

Measurement of Weight-Average Molecular Weight

Using a GPC apparatus described below, weight-average molecular weight in terms of standard polystyrene was measured.

Name of apparatus: HLC-8120 manufactured by Tosoh Corporation

Column: available from Tosoh Corporation, G7000HXL: 7.8 mm1 D×30 cm, one column; GMHXL: 7.8 mm1 D×30 cm, two columns; G2500HXL: 7.8 mm1D×30 cm, one column Sample concentration: Sample was used after it was diluted with tetrahydrofuran so that the concentration would become 1.5 mg/cm$^3$.

Mobile-Phase Solvent: Tetrahydrofuran

Flow rate: 1.0 cm$^3$/min

Column temperature: 40° C.

Viscosity Measurement

Using a BM type viscometer manufactured by Tokimec, Inc., viscosity was measured.

SEC-MALS Measurement

Using a GPC apparatus described below and using a multi angle light scattering detector (DAWN-HELEOS, manufactured by Wyatt), absolute molecular weight was measured.

Name of apparatus: HC-10A manufactured by Tosoh Corporation

Column: available from Tosoh Corporation, GMHXL: 7.8 mm1D×30 cm, one column

Sample concentration: Sample was used after it was diluted with tetrahydrofuran so that the concentration would become 2.5 mg/cm$^3$ or 1.0 mg/cm$^3$.

Mobile-phase solvent: tetrahydrofuran

Flow rate: 1.0 cm$^3$/min

Column temperature: 40° C.

Measurement of $^1$H-NMR Spectrum (Determination of Quantity of End Double Bonds)

Using a Inova 500 spectrometer manufactured by Varian, measurement of a $^1$H-NMR spectrum was carried out, and as a standard for chemical shift, a signal of TMS was defined as 0.00 ppm.

The signal of proton due to the end double bond was observed at σ=5.5 ppm and σ=6.2 ppm.

A ratio of an area of this signal to an area of the signal due to methylene adjacent to the carboxyl oxygen at σ=4 ppm or a ratio of an area of this signal to an area of the signal of end methyl in the vicinity of σ=1 ppm was determined, and from a relationship between the area ratio and the degree of polymerization of the polymer, the quantity of end double bonds based on one polymer chain was calculated.

Holding Power Test

The adhesive sheet was applied to a stainless steel plate so that the applied area would become 20 mm×20 mm, then a load of 1 kg was applied to the adhesive sheet at 80° C., and a time (unit: hr) for the fall of the adhesive sheet was measured.

Application to Curved Surface

The adhesive sheet was cut into a sheet of 20 mm×50 mm, then the sheet was applied to a stainless bar of Ø50, and after 72 hours at 40° C., the applied condition was observed.

Preparation Example 1

Measurement of Molecular Weight of (Meth)acrylic Polymer (B) and Determination Quantity of End Group In a flask having a volume of 2 liters, 1000 g of butyl acrylate (BA) was placed, and air in the flask was replaced with a nitrogen gas. Thereafter, the reaction system was heated up to 148° C. without using a molecular weight modifier, an organic solvent and a thermal initiator.

The reaction began slowly, and viscosity increase was confirmed. Subsequently, the reaction was continued for 2 hours with maintaining the temperature at 148° C., then the reaction system was cooled down to 25° C., and vacuum drying was carried out to obtain 340 g of an acrylic polymer A. This acrylic polymer A had, as molecular weights, Mn of 90,000 and Mw of 210,000.

The resulting reactive polymer A was dissolved in deuterated chloroform, and a $^1$H-NMR spectrum was measured. As a standard for chemical shift, a signal of TMS was defined as 0.00 ppm. The $^1$H-NMR spectrum was shown in FIG. 1.

The area ratio of the signal (σ=5.5 ppm and σ=6.2 ppm) of proton derived from the end double bond to a proton signal (σ=near 4 ppm) of methylene adjacent to the carboxyl oxygen and a proton signal (σ=near 1 ppm) of end methyl was 2.77/1998/3000, and the area ratio based on one proton was 1.39/999/1000. That is to say, the polymer A proved to have 1.39 double bonds based on 1000 units of the monomer.

Further, because the number-average molecular weight Mn was 90,000 and the molecular weight of BA was 128.17, the average number of monomer units based on one polymer chain of the acrylic polymer A was 702, and the number of the end double bonds based on one polymer chain was 0.98 bond/polymer.

Example 1

Preparation of Adhesive Composition 1

In a flask having a volume of 2 liters, 970 g of butyl acrylate (BA) and 30 g of acrylic acid (AA) were placed, and air in the flask was replaced with a nitrogen gas. Thereafter, the reaction system was heated to 80° C., and 0.025 g of 2,2-azobis (4-methoxy-2,4-dimethylvaleronitrile) (available from Wako Pure Chemical Industries, Ltd.) which was a thermal initiator was introduced without using a molecular weight modifier and an organic solvent.

Immediately after introduction of the thermal initiator, the reaction began, and temperature increase due to heat of polymerization was confirmed. Then, the reaction was continued without performing cooling operation.

After the temperature of the reaction system reached 118° C., the reaction was completed. Subsequently, forced cooling operation was carried out externally to cool the reaction system down to 25° C., whereby an adhesive composition 1 was obtained. This adhesive composition 1 contained a polymer portion in an amount of 17.6 parts by weight based on 100 parts by weight of the monomers. The adhesive composition 1 had a viscosity of 3.7 Pa·s, and the polymer portion had Mn of 280,000 and Mw of 700,000.

This polymer portion was subjected to NMR measurement, and the quantity of the end double bonds was determined in the same manner as in Example 1. As a result, it was 0.51 bond/1 polymer chain.

Example 2

Preparation of Adhesive Composition 2

In a flask having a volume of 2 liters, 910 g of butyl acrylate (BA), 50 g of methyl acrylate (MA), 30 g of acrylic acid (AA) and 10 g of 2-hydroxyethyl acrylate (2HEA) were placed, and air in the flask was replaced with a nitrogen gas. Thereafter, the reaction system was heated up to 148° C. without using a molecular weight modifier, an organic solvent and a thermal initiator. The reaction began slowly, and viscosity increase was confirmed. Subsequently, the reaction was continued for 2 hours with maintaining the temperature at 148° C., and then the reaction system was cooled down to 25° C. to obtain an adhesive composition 2. This adhesive composition 2 contained a polymer portion in an amount of 49.3 parts by weight based on 100 parts by weight of the monomers. The adhesive composition 2 had a viscosity of 2.6 Pa·s, and the polymer portion had Mn of 110,000 and Mw of 280,000.

This polymer portion was subjected to NMR measurement, and the quantity of the end double bonds was determined in the same manner as in Example 1. As a result, it was 0.93 bond/1 polymer chain.

Example 3

Preparation of Adhesive Composition 3

In a flask having a volume of 2 liters, 970 g of butyl acrylate (BA) and 30 g of acrylic acid (AA) were placed, and air in the flask was replaced with a nitrogen gas. Thereafter, the flask was pressurized with a nitrogen gas, and the reaction system was heated up to 180° C. without using a molecular weight modifier, an organic solvent and a thermal initiator. The reaction began slowly, and viscosity increase was confirmed. Subsequently, the reaction was continued for 2 hours with maintaining the temperature at 180° C., and then the reaction system was cooled down to 25° C. Thereafter, a part of unreacted monomers was removed to obtain an adhesive composition 3. This adhesive composition 3 contained a polymer portion in an amount of 300 parts by weight based on 100 parts by weight of the monomers. The adhesive composition 3 had a viscosity of 7.4 Pa·s, and the polymer portion had Mn of 31,000 and Mw of 56,000.

This polymer portion was subjected to NMR measurement, and the quantity of the end double bonds was determined in the same manner as in Example 1. As a result, it was 1.00 bond/1 polymer chain.

Comparative Example 1

Preparation of Adhesive Composition 4

In a flask having a volume of 2 liters, 970 g of butyl acrylate (BA), 30 g of acrylic acid (AA) and 0.1 g of normal dodecylmercaptan (NDM) which was a molecular weight modifier were placed, and air in the flask was replaced with a nitrogen gas. Thereafter, the reaction system was heated to 50° C., and 0.025 g of 2,2-azobis(4-methoxy-2,4-dimethylvaleronitrile) (available from Wako Pure Chemical Industries, Ltd.) which was a thermal initiator was introduced.

After 3 minutes from introduction of the thermal initiator, the reaction began, and temperature increase due to heat of polymerization was confirmed. Then, the reaction was continued without performing cooling operation.

After the temperature of the reaction system reached 121° C., the reaction was completed.

Subsequently, 194 g of butyl acrylate (BA) and 6 g of acrylic acid (AA) were added as cooling media to rapidly lower the temperature of the reaction system to not higher than 100° C., and besides, forced cooling operation was carried out externally to cool the reaction system down to 25° C., whereby an adhesive composition 4 was obtained.

This adhesive composition 4 contained a polymer portion in an amount of 25 parts by weight based on 100 parts by weight of the monomers. The adhesive composition 4 had a viscosity of 6.5 Pa·s, and the polymer portion had Mn of 340,000 and Mw of 730,000.

This polymer portion was subjected to NMR measurement, and the quantity of the end double bonds was determined in the same manner as in Example 1. As a result, it was 0.08 bond/1 polymer chain.

Comparative Example 2

Preparation of Adhesive Composition 5

100 g of the adhesive composition obtained in Example 1 was withdrawn, and to the composition were added 97 g of butyl acrylate (BA) and 3 g of acrylic acid (AA) to obtain an adhesive composition 5 containing a polymer portion in an amount of 8.1 parts by weight based on 100 parts by weight of the monomers and having a viscosity of 1.0 Pa·s.

Comparative Example 3

Preparation of Adhesive Composition 6

In a pressure flask having a volume of 2 liters, 970 g of butyl acrylate (BA) and 30 g of acrylic acid (AA) were placed, and air in the flask was replaced with a nitrogen gas. Thereafter, the reaction system was heated to 250° C. under pressure with nitrogen, and thermal polymerization was carried out without introducing a thermal initiator.

The temperature of the reaction system was still maintained at 250° C., and the reaction was continued for 0.5 hour. Then, the reaction system was cooled down to 25° C. to obtain an adhesive composition 6.

This adhesive composition 6 contained a polymer portion in an amount of 42.9 parts by weight based on 100 parts by weight of the monomers. The adhesive composition 6 had a viscosity of 0.05 Pa·s, and the polymer portion had Mn of 2,000 and Mw of 3,700.

This polymer portion was subjected to NMR measurement, and the quantity of the end double bonds was determined in the same manner as in Example 1. As a result, it was 0.81 bond/1 polymer chain.

Comparative Example 4

Preparation of Adhesive Composition 7

In a flask having a volume of 5 liters, 970 g of butyl acrylate (BA), 30 g of acrylic acid (AA), 300 g of ethyl acetate and 700 g of toluene were placed, and air in the flask was replaced with a nitrogen gas. Thereafter, the reaction system was heated to 70° C., and 1.0 g of 2,2-azobis(4-methoxy-2,4-dimethylvaleronitrile) (available from Wako Pure Chemical Industries, Ltd.) which was a thermal initiator was introduced.

Immediately after introduction of the thermal initiator, the reaction began, and temperature increase due to heat of polymerization was confirmed. Then, by carrying out cooling operation, the reaction temperature was maintained at 75° C., and the reaction was carried out for 5 hours. Immediately, 2000 g of ethyl acetate was introduced, and the reaction system was cooled to complete the reaction. This reaction solution was heated and dried to obtain 950 g of a polymer B. The polymer B had Mn of 93,000 and Mw of 350,000.

The polymer B was subjected to NMR measurement, and the quantity of the end double bonds was determined in the same manner as in Example 1. As a result, it was 0.09 bond/1 polymer chain.

43 g of the resulting polymer B was mixed with 96 g of butyl acrylate (BA) and 4 g of acrylic acid (AA) to prepare an adhesive composition 7.

This adhesive composition 7 contained a polymer portion in an amount of 43 parts by weight based on 100 parts by weight of the monomers, and the adhesive composition 7 had a viscosity of 2.5 Pa·s.

The amounts of the components of the adhesive compositions obtained above and properties of the adhesive compositions are set forth in Table 1.

Examples 4 to 6 and Comparative Examples 5 to 8

The adhesive blends 1M to 7M obtained above were each applied onto a PET film of 188 μm so that the thickness would become 25 μm, and a PET separator was laminated thereon to shut off air. From above the PET separator, the adhesive blend applied was irradiated with light having an intensity of 25 mW/cm$^2$ for 2 minutes by the use of an UV lamp to subject the adhesive blend to polymerization curing, whereby adhesive sheets 1S to 7S were obtained.

The resulting adhesive sheets were each subjected to GPC measurement to determine a relative molecular weight in terms of PSt and an absolute molecular weight by SEC-MALS. The results are set forth in Table 2.

TABLE 2

| | Adhesive sheet | Relative molecular weight in terms of PSt by GPC measurement (unit: ×10$^4$) | Absolute molecular weight by SEC-MALS (unit: ×10$^4$) |
|---|---|---|---|
| Ex. 4 | 1S | 44 | 79 |
| Ex. 5 | 2S | 46 | 82 |
| Ex. 6 | 3S | 36 | 80 |
| Comp. Ex. 5 | 4S | 40 | 44 |
| Comp. Ex. 6 | 5S | 43 | 46 |
| Comp. Ex. 7 | 6S | 33 | 39 |
| Comp. Ex. 8 | 7S | 37 | 40 |

It can be seen from the results that the adhesive compositions of the invention after curing had a difference between the relative molecular weight in terms of PSt and the absolute molecular weight measured by the GPC measurement, so that they had branched structures. Hence, the adhesive sheets obtained from the adhesive compositions can have excellent stress relaxation property (application property to curved surface).

Preparation of Adhesive Blends 1N to 7N

To 100 g of each of the adhesive compositions 1 to 7, 0.5 g of a photoinitiator Irgacure 2020 available from Ciba Specialty Chemicals Inc. and 0.05 g of an epoxy-based crosslinking agent E-100X available from Soken Chemical & Engineering Co., Ltd. were added, and they were blended to prepare adhesive blends 1N to 7N.

TABLE 1

| | Adhesive Composition | (a) (Meth)acrylic monomer (part(s) by weight) | (b) (Meth)acrylic polymer (part(s) by weight) | Mw (×10$^4$) | Quantity of end double bonds (bond/1 polymer chain) | Viscosity (Pa·s) |
|---|---|---|---|---|---|---|
| Ex. 1 | 1 | 100 | 17.6 | 70 | 0.51 | 3.7 |
| Ex. 2 | 2 | 100 | 49.3 | 28 | 0.93 | 2.6 |
| Ex. 3 | 3 | 100 | 300.0 | 5.6 | 1.00 | 7.4 |
| Comp. Ex. 1 | 4 | 100 | 25.0 | 73 | 0.08 | 6.5 |
| Comp. Ex. 2 | 5 | 100 | 8.1 | 70 | 0.51 | 1.0 |
| Comp. Ex. 3 | 6 | 100 | 42.9 | 0.37 | 0.81 | 0.05 |
| Comp. Ex. 4 | 7 | 100 | 43.0 | 35 | 0.09 | 2.5 |

Preparation of Adhesive Blends 1M to 7M

To 100 g of each of the adhesive compositions 1 to 7, 0.5 g of a photoinitiator Irgacure 2020 available from Ciba Specialty Chemicals Inc. was added, and they were blended to prepare adhesive blends 1M to 7M.

Examples 7 to 9 and Comparative Examples 9 to 12

The adhesive blends 1N to 7N obtained above were each applied onto a PET film of 188 μm so that the thickness would become 25 μm, and a PET separator was laminated thereon to shutoff air. From above the PET separator, the adhesive blend applied was irradiated with light having an intensity of 25 mW/cm² for 2 minutes by the use of an UV lamp to subject the adhesive blend to polymerization curing, whereby adhesive sheets 1T to 7T were obtained.

The resulting adhesive sheets were evaluated on the adhesive properties. The results are set forth in Table 3.

TABLE 3

| | Adhesive sheet | Adhesive properties, Holding power | Application to curved surface |
|---|---|---|---|
| Ex. 7 | 1T | not shorter than 500 hrs | no lifting, no peeling |
| Ex. 8 | 2T | not shorter than 500 hrs | no lifting, no peeling |
| Ex. 9 | 3T | not shorter than 500 hrs | no lifting, no peeling |
| Comp. Ex. 9 | 4T | 200 to 400 hrs | 3 mm-lifting |
| Comp. Ex. 10 | 5T | not shorter than 500 hrs | 3 mm-lifting |
| Comp. Ex. 11 | 6T | 200 to 400 hrs | 5 mm-lifting |
| Comp. Ex. 12 | 7T | 200 to 400 hrs | 5 mm-lifting |

Examples 7 to 9 exhibited excellent results in both of the thermal holding power and the application property to curved surface. On the other hand, Comparative Examples 9 to 12 were insufficient in the thermal holding power or in the application property to curved surface, so that they could not exhibit properties of a good balance.

The adhesive composition of the invention contains 0.3 to 1 polymerizable double bond based on one polymer chain at the molecular end, and therefore, when an adhesive layer is formed by the use of this adhesive composition, a high-molecular weight adhesive having high cohesive force and excellent thermal adhesive property is efficiently obtained. Further, because of excellent polymerization reactivity to monomers, the polymer has a branched structure, and this polymer becomes an adhesive having excellent stress relaxation property. Such an adhesive exhibits excellent adhesive strength in application not only to a flat surface but also to a surface with depressions and protrusions and a curved surface, so that it can be practically used in a wide field.

The invention claimed is:

1. An adhesive composition comprising:
100 parts by weight of (a) a (meth)acrylic monomer, and
10 to 400 parts by weight of (b) a (meth)acrylic polymer containing a (meth)acrylic ester as a main monomer,
wherein the weight-average molecular weight of the (meth)acrylic polymer (b) in terms of standard polystyrene, as measured by GPC, is in the range of 50,000 to 800,000, and
the (meth)acrylic polymer (b) has 0.3 to 1 end group represented by the formula (1) based on one polymer chain,

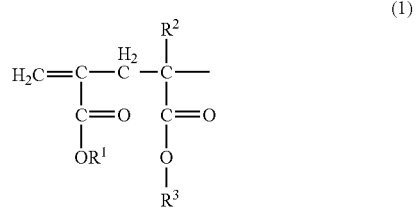

(1)

wherein R¹ is an alkyl or aryl group of 1 to 12 carbon atoms, R² is a hydrogen atom or a methyl group, and R³ is a hydrogen atom, an alkyl or aryl group of 1 to 12 carbon atoms.

2. The adhesive composition as claimed in claim 1, wherein the (meth)acrylic ester is contained in an amount of not less than 60% by weight in 100% by weight of the total of the (meth)acrylic monomer (a) and monomers to constitute the (meth)acrylic polymer (b).

3. An adhesive obtained from the adhesive composition of claim 1.

4. An adhesive sheet having an adhesive layer obtained from the adhesive composition of claim 1.

5. An adhesive obtained from the adhesive composition of claim 2.

6. An adhesive sheet having an adhesive layer obtained from the adhesive composition of claim 5.

7. An adhesive sheet having an adhesive layer obtained from the adhesive composition of claim 2.

* * * * *